(12) United States Patent
Shiiyama et al.

(10) Patent No.: US 10,664,523 B2
(45) Date of Patent: May 26, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hirotaka Shiiyama, Yokohama (JP); Masahiro Matsushita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 15/490,345

(22) Filed: Apr. 18, 2017

(65) Prior Publication Data
US 2017/0300569 A1     Oct. 19, 2017

(30) Foreign Application Priority Data

Apr. 19, 2016   (JP) ................................ 2016-083874
Apr. 19, 2016   (JP) ................................ 2016-083882

(51) Int. Cl.
*G06F 16/783*   (2019.01)
*G06F 16/738*   (2019.01)
(Continued)

(52) U.S. Cl.
CPC .......... *G06F 16/784* (2019.01); *G06F 16/738* (2019.01); *G06F 16/7867* (2019.01);
(Continued)

(58) Field of Classification Search
CPC .. G06F 16/784; G06F 16/7867; G06F 16/738; G06K 9/00771; G06K 9/00268; G06K 9/00369; G06K 9/00288
(Continued)

(56) References Cited

U.S. PATENT DOCUMENTS

2004/0117638 A1    6/2004  Monroe
2007/0248244 A1*  10/2007  Sato ................... G06K 9/00771
                                                               382/103
(Continued)

FOREIGN PATENT DOCUMENTS

JP    2002-373332 A    12/2002
JP    2010-165156 A     7/2010
(Continued)

OTHER PUBLICATIONS

Extended European Search Report dated Sep. 15, 2017 in corresponding European Application No. 17000633.2-1507, 7 pages.
(Continued)

*Primary Examiner* — Wesley J Tucker
(74) *Attorney, Agent, or Firm* — Carter, DeLuca & Farrell LLP

(57) ABSTRACT

A first retriever performs, based on a person feature of a person extracted from a video image before an acceptance time point of a retrieval instruction of a target person and stored and a feature extracted from the target person related to the retrieval instruction, a first retrieving process of retrieving the target person from the video image stored, a second retriever performs, based on a feature of a person extracted from a video image after the acceptance time point and the feature of the target person extracted from a query image of the retrieval instruction, a second retrieving process of retrieving the target person from the video image input after the acceptance time point, and the first retriever performs the first retrieving process to the video image input during a period from the acceptance time point to preparation completion of the second retrieving process and second retrieving process start.

21 Claims, 11 Drawing Sheets

(51) Int. Cl.
*G06F 16/78* (2019.01)
*G06K 9/00* (2006.01)

(52) U.S. Cl.
CPC ..... *G06K 9/00268* (2013.01); *G06K 9/00288* (2013.01); *G06K 9/00369* (2013.01); *G06K 9/00771* (2013.01)

(58) Field of Classification Search
USPC .................................................. 382/305, 118
See application file for complete search history.

(56) References Cited

U.S. PATENT DOCUMENTS

| | | | |
|---|---|---|---|
| 2008/0080743 A1 | 4/2008 | Schneiderman et al. | |
| 2015/0286719 A1 | 10/2015 | Sampathkumaran | |
| 2016/0092452 A1* | 3/2016 | Wang .................. | G06F 16/2477 707/752 |
| 2017/0039419 A1 | 2/2017 | Shiiyama et al. | |
| 2017/0075993 A1 | 3/2017 | Matsushita et al. | |

FOREIGN PATENT DOCUMENTS

| | | |
|---|---|---|
| JP | 2011-186576 A | 9/2011 |
| JP | 2013-153304 A | 8/2013 |
| JP | 2014-215747 A | 11/2014 |
| JP | 2015228564 A | 12/2015 |

OTHER PUBLICATIONS

Erik Murphy-Chutorian, "Head pose estimation for driver assistance systems: A robust algorithm and experimental evaluation," in Proc. IEEE Conf. Intelligent Transportation Systems, 2007, pp. 709-714.

Notification of Reason for Refusal issued by the Korean Intellectual Property Office dated Feb. 26, 2020 in corresponding Korean Patent Application No. 10-2017-0045801, with English translation.

Notice of Reasons for Refusal issued by the JP Patent Office dated Apr. 7, 2020 in corresponding JP Patent Application No. 2016-083874, with English translation.

* cited by examiner

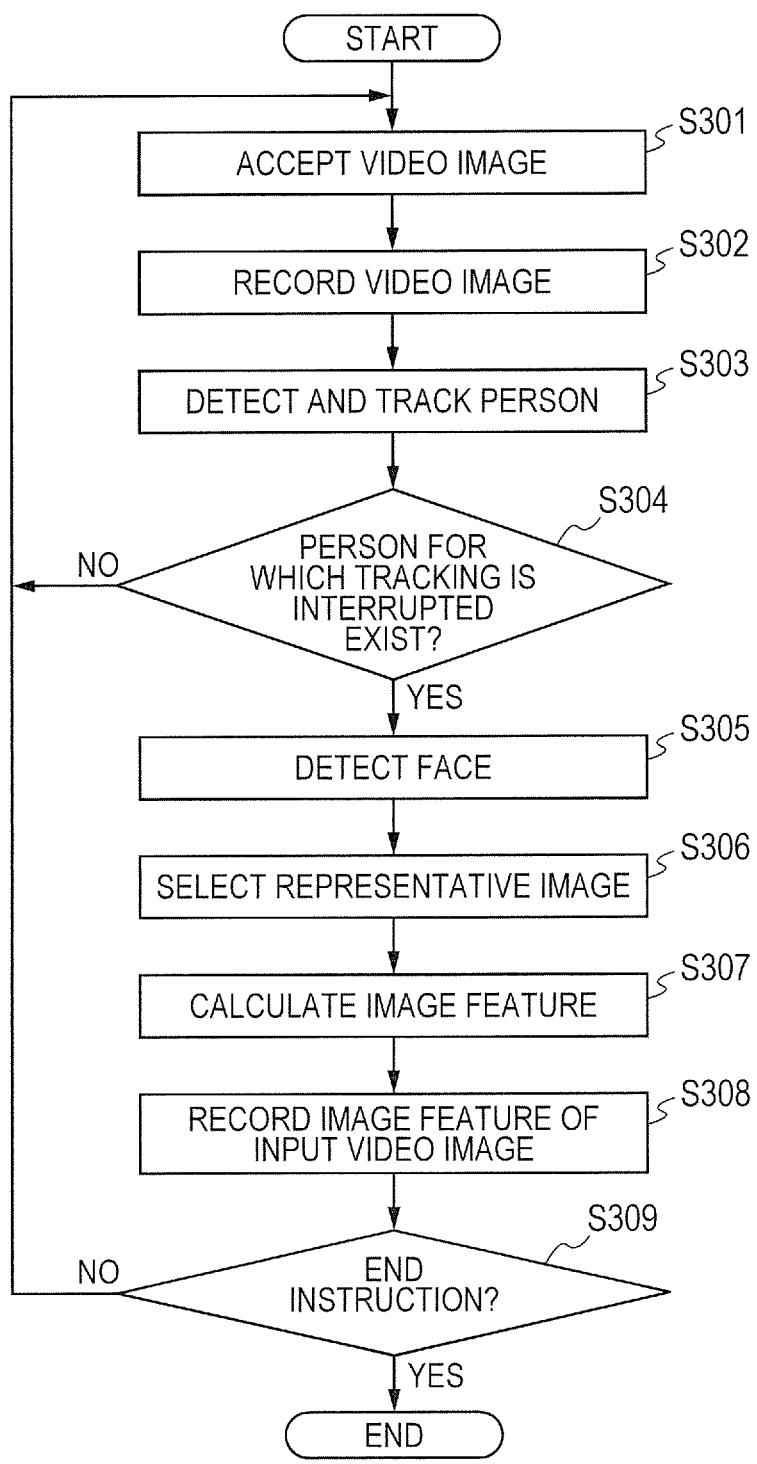

|  | FIRST RETRIEVING PROCESS | SECOND RETRIEVING PROCESS |
|---|---|---|
| ARBITRARY PERSON RETRIEVAL | ◎ | × PRE-REGISTRATION REQUIRED |
| ACCURACY | ○ | ◎ |
| SPEED (THROUGHPUT) REGISTRATION + RETRIEVAL | △ | ○ |
| FAVORABLE USE | RETRIEVAL OF ARBITRARY PERSON FROM PAST HUGE IMAGES, FROM ACCUMULATED MOVING IMAGES | REAL-TIME AUTHENTICATION OF LIMITED NUMBER OF SPECIFIC PERSONS |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium storing a program for performing the information processing method.

Description of the Related Art

Conventionally, there has been known a technique of detecting a stray child (i.e., a child who is lost) and/or a missing passenger (i.e., a passenger who missed a train or the like), by retrieving the faces of persons from each frame of a surveillance video image. Japanese Patent Application Laid-Open No. 2013-153304 discloses the technique of detecting the face of a person from each frame of a surveillance video image, calculating the image feature from the detected face, storing the calculated image feature in a DB (database) in association with the frame of the video image, and retrieving the video image of a stray child from the DB by using, for example, the face of the stray child as a query. Besides, Japanese Patent Application Laid-Open No. 2014-215747 discloses the technique of previously registering the face of a person to be detected and then detecting the person in real time from an input video image.

However, in the technique disclosed in Japanese Patent Application Laid-Open No. 2013-153304, the video images which have been stored and accumulated in the DB at a time point when the query is issued are to be retrieved. However, a target person (i.e., a person who is targeted) cannot be retrieved from the video image obtained after the relevant time point. For this reason, it is impossible in this technique to inform a user of the current whereabouts of the stray child and/or a missing passenger for securing them. Besides, in the technique disclosed in Japanese Patent Application Laid-Open No. 2014-215747, when retroactively retrieving a person from the video image before a time point when a query is issued, a processing speed is decreased. Therefore, to secure a stray child and/or a missing passenger, the technique in Japanese Patent Application Laid-Open No. 2014-215747 is insufficient.

The present invention has been completed in view of such problems as described above, and an object of the present invention is to continuously retrieve a person from the past without decreasing a processing speed.

SUMMARY OF THE INVENTION

Therefore, according to the present invention, there is provided an information processing apparatus which is characterized by comprising: an accepting unit configured to accept a retrieval instruction of a target person; a first retrieving unit configured to, based on a feature of a person extracted from a video image input from an imaging unit before an acceptance time point of the retrieval instruction and stored in a storing unit and a feature extracted from the target person related to the retrieval instruction, perform a first retrieving process of retrieving the target person from the video image stored in the storing unit; and a second retrieving unit configured to, based on a feature of a person extracted from a video image input from the imaging unit after the acceptance time point and the feature of the target person extracted from a query image related to the retrieval instruction, perform a second retrieving process of retrieving the target person from the video image input after the acceptance time point, wherein the first retrieving unit is configured to perform the first retrieving process to the video image input during a period from the acceptance time point to a time when preparation of the second retrieving process by the second retrieving unit is completed and the second retrieving process is started.

Further features of the present invention will become apparent from the following description of exemplary embodiments with reference to the attached drawings.

BRIEF DESCRIPTION OF THE DRAWINGS

FIG. 3 is a flow chart for describing a video image recording process.

DESCRIPTION OF THE EMBODIMENTS

Hereinafter, preferred embodiments of the present invention will be described in detail with reference to the accompanying drawings.

First Embodiment

Figure 1:
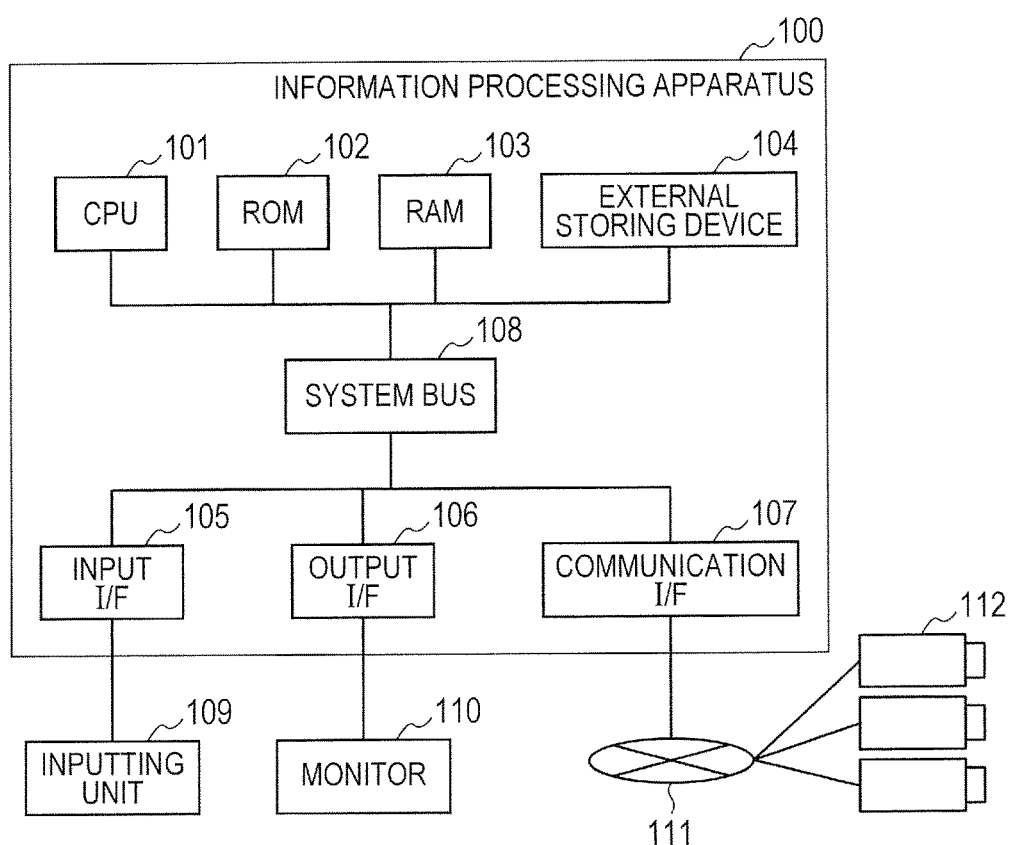
FIG. 1 is a diagram for describing a monitoring (surveillance) system according to a first embodiment.

FIG. 1 is a diagram for describing a monitoring (surveillance) system according to the first embodiment. The monitoring system comprises an information processing apparatus 100 and cameras 112 serving as imaging units, and retrieves a person designated as a query. In FIG. 1, although a case where a person detecting system comprises the three cameras 112 is exemplified, the number of the cameras 112 is not limited to that described in the embodiment. The information processing apparatus 100 and the camera 112 are connected to each other via a network 111.

A CPU 101 is a central processing unit which controls the entire information processing apparatus 100. A ROM 102 is a read only memory which stores therein programs and parameters for which any modification is not required. A RAM 103 is a random access memory which temporarily stores therein programs and data supplied from an external device or the like. An external storing device 104 is a storing device such as a hard disk, a memory card or the like fixedly installed in the information processing apparatus 100. Incidentally, the external storing device 104 may include an optical disk such as an FD (flexible disk) or a CD (compact disk) which can be detached from the information processing apparatus 100, a magnetic or optical card, an IC (integrated circuit) card, a memory card, and the like. The later-described functions and processes of the information processing apparatus 100 are achieved on the premise that the CPU 101 reads the programs stored in the ROM 102 or the external storing device 104 and then executes the read programs.

An input I/F (interface) 105 is an interface with an inputting unit 109 such as a pointing device, a keyboard or the like which receives user's operations and inputs various data. An outputting device I/F 106 is an interface with a monitor 110 which displays the data held by the information processing apparatus 100 and supplied data. A communication I/F 107 is connected to the network 111 such as the Internet or the like. The camera 112 is the imaging device such as a surveillance camera or the like which images and captures video images, and is connected to the information processing apparatus 100 via the network 111. A system bus 108 is a transmission path for communicably connecting the respective units 101 to 107.

Figure 2:
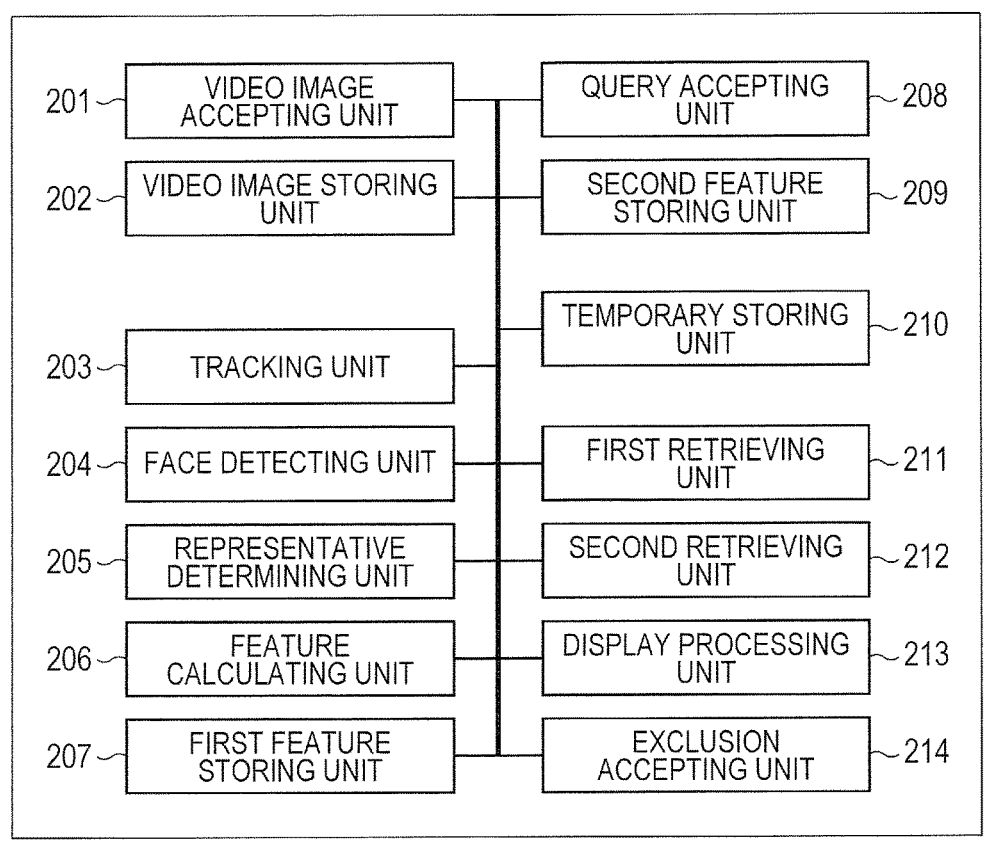
FIG. 2 is a diagram for describing a software configuration of an information processing apparatus.

FIG. 2 is a diagram for describing a software configuration of the information processing apparatus 100. The information processing apparatus 100 uses a face image feature obtained from a face as an image feature, and performs image feature retrieval using the obtained face image feature. A video image accepting unit 201 accepts a video image photographed by the camera 112 and input from the camera 112 to the information processing apparatus 100. A video image storing unit 202 stores therein the video image accepted by the video image accepting unit 201.

A tracking unit 203 tracks a person in the video image accepted by the video image accepting unit 201. More specifically, the tracking unit 203 detects an object from a motion vector, estimates the retrieval position in a next frame, and performs person tracking by template matching. Regarding a person tracking process, the following document can be referred.

Japanese Patent Application Laid-Open No. 2002-373332

The tracking unit 203 issues a same track ID (identification) for tracks which track a same person, and issues different track IDs for tracks which track different persons, so that uniqueness is guaranteed and it is possible to identify the same person from the track ID. Incidentally, the tracking unit 203 issues different track IDs even for the same person, when tracking is once interrupted.

A face detecting unit 204 performs face detection from the frame image or the like in the video image. For example, the face detecting unit 204 performs the face detection from each of the frame images of the person tracked by the tracking unit 203. Also, the face detecting unit performs the face detection from the video image input from the video image accepting unit 201, or from a later-described query image. The face detecting unit 204 detects a one-eye candidate area with respect to the image to be processed, performs pairing from the plurality of one-eye candidate areas, and determines the face area based on a both-eyes position subjected to the pairing. Incidentally, regarding the method of detecting the face of a person from an image, the following document can be referred.

Japanese Patent Application Laid-Open No. 2010-165156

A representative determining unit 205 selects a representative face image from a frame image group of the tracked person. Hereinafter, it should be noted that the representative face image is referred to as a representative image. For example, the representative determining unit 205 selects an image having a large face size from among the face images detected by the face detecting unit 204. The reason why using the face size is that there is a problem of accuracy of an image feature. Namely, the larger the face image is, the more accurate image feature is obtained. That is, when calculating the image feature from the face image, it is necessary to perform a face size normalizing process of changing the size of the face image to a certain size. In this case, if the face image is larger than the certain size, since a reducing process is performed, loss of information is relatively small. However, if the face image is smaller than the certain size, since it is necessary to perform pixel interpolation such as a super resolution process, information is intensively deteriorated.

As another example, the representative determining unit 205 may select a plurality of images from the frame image group as the representative images. For example, there is a method of selecting images of a plurality of face directions. This is because, even if the images correspond to the same person, the image features obtained from the images are different if the face directions in these images are different.

The representative determining unit 205 extracts an HOG (histogram of oriented gradient) as the feature, and estimates the direction of the face with SVR (support vector regression). The HOG is a feature which is obtained with a histogram of luminance gradient information of the image for each local area of the image, and the HOG is known as a feature which is robust to local noise and brightness of the image. By selecting the feature which is robust to changes such as a noise change and an illumination change not related to the direction of the face, stable face direction estimation is achieved even in the real environment. Incidentally, regarding the method of detecting the face direction of a person from an image, the following document can be referred.

Erik Murphy-Chutorian, "Head pose estimation for driver assistance systems: A robust algorithm and experimental evaluation," in Proc. IEEE Conf. Intelligent Transportation Systems, 2007, pp. 709-714

Besides, the representative determining unit 205 may detect the direction of the human body of a person in place of the face direction of a person. Regarding the detection of the direction of the human body, for example, the method described in the following document can be used.

Japanese Patent Application Laid-Open No. 2011-186576

As another example, the representative determining unit 205 may further select an image with a less image blur as the representative image. As well as a camera for photographing a still image, also in a camera for shooting or photographing a moving image, there is a case where a shutter speed changes according to the brightness of the shooting/photographing place. Therefore, there is a case where a blur of the face image sometimes occurs depending on a dark place or a movement speed of a subject, and the relevant blur directly causes deterioration of an image feature and attribute information. In case of estimating the blur, the representative determining unit 205 obtains the frequency component of a face image area, obtains the ratio between the low frequency component and the high frequency component, and may decide that the blur occurs when the obtained ratio exceeds a predetermined value. In addition, the representative determining unit 205 may not select a face image such as a closed-eyes face image, an opened-mouth face image or the like, as the representative image. This is because there is a possibility that the image features of the organs may be altered if eyes are closed, a mouth is opened, or the like.

A feature calculating unit 206 calculates the image feature of the face image to be processed. More specifically, the feature calculating unit 206 obtains the organ points such as the eyes, the mouth and the like in the face image of a person, and then calculates a SIFT (scale invariant feature transform) feature for each of the organ points. Incidentally, it should be noted that this feature is merely an example, and the type of feature to be calculated is not limited to that used in the present embodiment. A first feature storing unit 207 stores therein the image feature calculated by the feature calculating unit 206 with respect to the video image accepted by the video image accepting unit 201. The first feature storing unit 207 further stores therein the ID of the person, the track ID in case of tracking the person, the photographing (shooting) time, and the camera ID of the photographed camera 112 while associating them, as metadata of the image feature. The first feature storing unit 207 is, for example, the external storing device 104.

A query accepting unit 208 accepts designation of a query image. Here, it should be noted that the query image is the face image of a person serving as a retrieval key, and that the person being the retrieval key is referred to as a target person. For example, the CPU 101 displays the face image stored in the external storing device 104 on the monitor 110. Then, while watching the monitor 110, a user selects the face image of the person to be retrieved as the query image via the inputting unit 109. In response to this selection, the query accepting unit 208 accepts the query image selected by the user. It should be noted that the query image may be a single image or two or more images.

A second feature storing unit 209 stores therein the image feature of the query image (face image) accepted by the query accepting unit 208. Here, it should be noted that the image feature of the query image is an example of a reference feature predetermined for the target person. The image feature of the query image is calculated by the feature calculating unit 206. The second feature storing unit 209 is, for example, the external storing device 104. The image feature of the query image is recorded in the second feature storing unit 209 by the CPU 101. Namely, such a process of recording the image feature of the query image in the second feature storing unit 209 is a preparing process for starting a retrieving process of the input image to be performed by a later-described second retrieving unit 212. Further, when accepting a later-described instruction to exclude the target, the CPU 101 deletes the image feature from the second feature storing unit 209.

A first retrieving unit 211 performs a first retrieving process. Here, it should be noted that the first retrieving process is a process of retrieving the target person from the video image of a retrieval range which is set for the first retrieving process, by using the image feature calculated from the query image as a query. The first retrieving unit 211 according to the present embodiment sets the image feature stored in the first feature storing unit 207 as the retrieval range, and identifies the image feature having similarity higher than a predetermined threshold in the first feature storing unit 207. In case of calculating the similarity, the sum of the distances of the SIFT features of each organ point is calculated, the sum of the distances is normalized, and then the similarity is obtained.

The second retrieving unit 212 performs a second retrieving process. Here, it should be noted that the second retrieving process is a process of retrieving the target person from the video image of a retrieval range which is set for the second retrieving process, by using the image feature (reference feature) stored in the second feature storing unit 209 as a query. The second retrieving unit 212 according to the present embodiment sets the image feature calculated from the video image accepted by the video image accepting unit 201 as the retrieval range, after a time point when a retrieval instruction which designates the query image is accepted. Here, the retrieval range includes not only the video image accepted by the video image accepting unit 201 but also a video image stored in a temporary storing unit 210. The second retrieving unit 212 identifies the image feature having similarity higher than a predetermined threshold in the retrieval range. The method of calculating the similarity is the same as that described with respect to the first retrieving unit 211.

A display processing unit 213 integrates the retrieval result of the first retrieving unit 211 and the identification result of the second retrieving unit 212 with each other, and displays the integrated result on the monitor 110. For example, the display processing unit 213 classifies the retrieval results for each camera 112, and displays them on the monitor 110 in order of photographing time. As another example, the display processing unit 213 mapping-displays the installation positions of the cameras 112, and displays the movement histories of these positions on the monitor 110 based on photographing time. The contents to be displayed are not limited to those described in the present embodiment.

An exclusion accepting unit 214 accepts information indicating the person who no longer needs to be retrieved by, for example, securing a stray child or a missing passenger, and then deletes the image feature of the relevant person from the second feature storing unit 209. In this case, it is possible to designate that the stray child or the missing passenger has been secured, on a user interface of the display processing unit 213. Further, in case of retrieving a passenger who missed an aircraft, it is also possible to detect that the passenger has passed through the boarding port of the relevant aircraft, and then delete the image feature of the person (the relevant passenger) from the second feature storing unit 209 by using the detected result as a trigger.

FIG. 3 is a flow chart for describing a video image recording process to be performed by the information processing apparatus 100. The video image recording process is a process of accumulating (or recording) the video images accepted by the video image accepting unit 201 such that the accumulated video images can be retrieved properly. In S301, the video image accepting unit 201 accepts the video image. Next, in S302, the CPU 101 records the video image accepted in S301 in the video image storing unit 202. At this time, the CPU 101 records the photographing time and the camera ID of the photographing camera 112 while associating them as the metadata of the video image. This process is an example of a recording process of recording the video image input from the camera 112 in the storing unit.

Next, in S303, the tracking unit 203 detects the person from each frame image, and performs tracking in regard to the detected person. Here, a different person ID is allocated to the detected person for each frame image, and the allocated person ID is temporarily stored together with the coordinates of the person in the frame image. Further, the same track ID is allocated to the person who is tracked, and the allocated track ID is temporarily stored together with the ID of the frame image for which the tracking is performed. In S304, when there is the person for which the tracking is interrupted (YES in S304), the tracking unit 203 advances the process to S305. On the other hand, when there is no person for which the tracking is interrupted (NO in S304), the tracking unit 203 returns the process to S301.

In S305, the face detecting unit 204 performs the face detection from each of the frame images of the person tracked by the tracking unit 203. Next, in S306, the representative determining unit 205 selects one or more representative face images from the frame image group of the tracked person. Next, in S307, the feature calculating unit 206 calculates the face image feature from the one or more face images selected in S306.

Next, in S308, the CPU 101 records the image feature calculated in S307 in the first feature storing unit 207. Furthermore, the CPU 101 records the person ID, the track ID in case of tracking the person, the photographing time and the photographing camera in association with others as the metadata of the image feature. Next, in S309, the CPU 101 confirms whether or not an end instruction of such an accumulating process is accepted. When the end instruction is accepted (YES in S309), the CPU 101 ends the process. On the other hand, when the end instruction is not accepted (NO in S309), the CPU 101 returns the process to S301. By the above process, the image feature of the face image of the person photographed and captured in the video image input from the camera 112 is accumulated in the first feature storing unit 207, and thus it becomes possible to perform the retrieval.

Figures 4A, 4B:
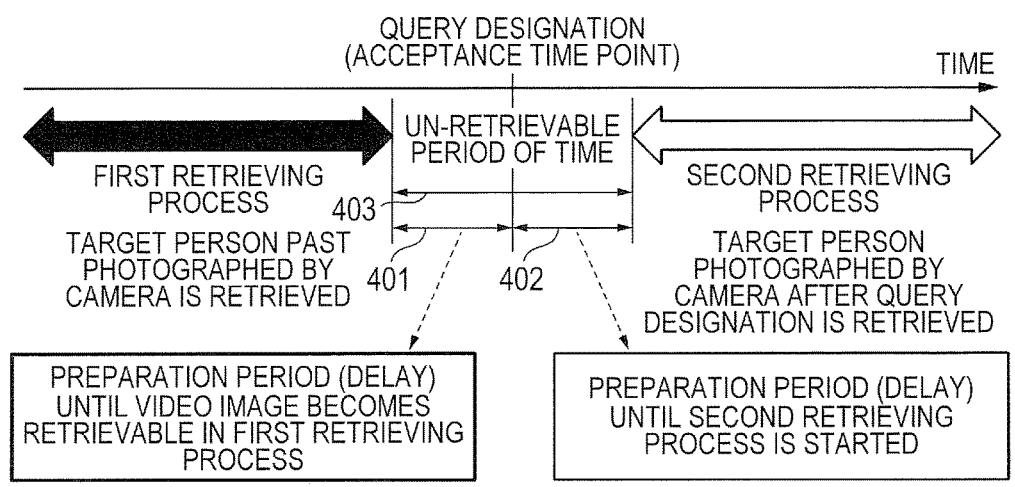
FIGS. 4A and 4B are explanatory diagrams of a first retrieving process and a second retrieving process.

Next, a person retrieving process to be performed by the information processing apparatus 100 will be described. Prior to the description of the person retrieving process, the first retrieving process to be performed by the first retrieving unit 211 and the second retrieving process to be performed by the second retrieving unit 212 will be described with reference to FIGS. 4A and 4B. Namely, FIGS. 4A and 4B are the explanatory diagrams of the first retrieving process and the second retrieving process. In the first retrieving process, collation (or checking) is performed using the extracted image feature as a query. For this reason, it is possible to perform the retrieval using an arbitrary person as the query. On the other hand, in the second retrieving process, it is necessary to previously register the image feature of a query person.

Regarding accuracy, the second retrieving process has merit in terms of accuracy by machine learning and the like. Regarding a speed, the first retrieving process is fast with respect to the retrieval of the registered video image. However, it takes a long time to reflect the retrieval result on the first feature storing unit 207, so that the speed is somewhat inferior from the viewpoint of throughput (registration and retrieval). On the other hand, in the second retrieving process, authentication can be performed in real time when the number of persons to be previously registered is suppressed to a certain number, so that throughput is considered to be high.

Therefore, preferable usage of the first retrieving process is to retrieve an arbitrary person from the accumulated moving images in the huge amount of past images, and preferable usage of the second retrieving process is to identify in real time the limited number of specific persons.

Therefore, the information processing apparatus 100 according to the present embodiment accepts the instruction to designate the query person, performs the first retrieving process to the video images before (past) the time point when the person retrieval is started, and performs the second retrieving process to the video images after (future) the relevant time point. Thus, for example, it is possible to appropriately retrieve a stray child.

The reason why the retrieval is performed also to the past video images is as follows. That is, since it is conceivable that the target person may be in a place not photographed by all the cameras 112, the information of the past place where the target person was being is also important. In addition, the past video images are also useful for estimating a place to which the target person will move.

However, a problem arises in case of only combining the first retrieving process and the second retrieving process. FIG. 4B is the diagram for describing retrieval ranges (time ranges) to be retrieved by the first retrieving process and the second retrieving process. In the first retrieving process, the video image recorded in the first feature storing unit 207 is set as the retrieval range. For this reason, a small preparation period (delay) 401 occurs until the video image at the acceptance time point of accepting the query designation can be retrieved. Here, the preparation period is a period from the acceptance time point when the video image accepting unit 201 accepts the retrieval instruction to the preparation completion time point when the preparation of the retrieving process by the second retrieving unit 212 is completed.

Also, in the second retrieving process, it takes time for initializing processes such as setting and learning of the image feature to be retrieved from the video image of each camera 112, so that a preparation period (delay) 402 occurs until the detection process becomes possible. For this reason, an un-retrievable period of time 403 which is a period of time obtained by adding the preparation period 401 and the preparation period 402 together occurs. In a security application such as the monitoring (surveillance) system, it is desirable to reduce the un-retrievable period of time 403.

Figure 5:
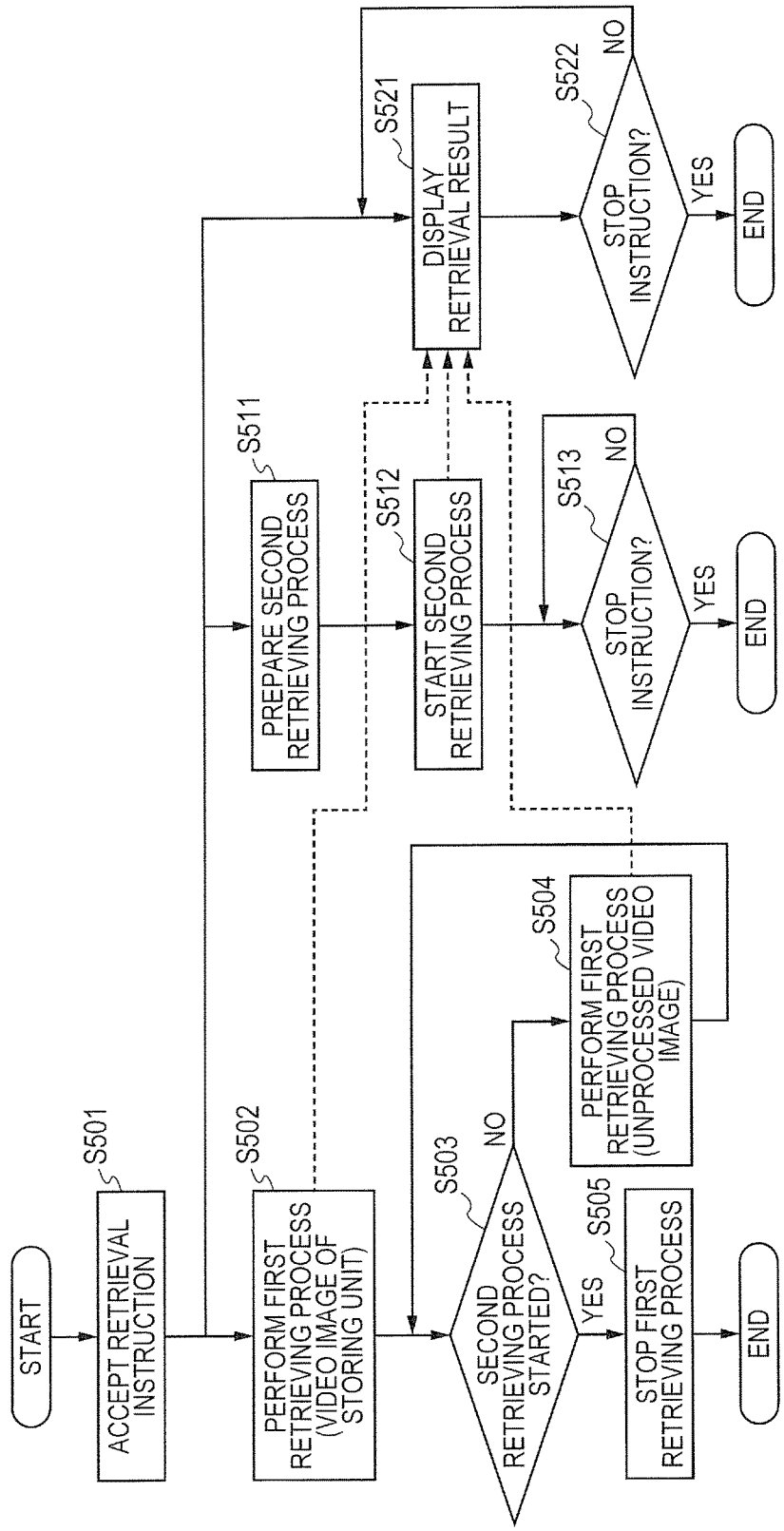
FIG. 5 is a flow chart for describing the retrieving process.

FIG. 5 is a flow chart for describing the retrieving process to be performed by the information processing apparatus 100. In S501, the query accepting unit 208 accepts a retrieval instruction designating a query image of the person being a retrieval query. After the process of S501, the CPU 101 performs the process in three threads. The first thread is a thread which performs the first retrieving process, and includes the processes of S502 to S505. The second thread is a thread which performs the second retrieving process, and includes the processes of S511 to S513. The third thread is a thread which performs a process of integrating and displaying retrieval results, and includes the processes of S521 and S522.

In S502 of the first thread, the first retrieving unit 211 performs the first retrieving process to retrieve the target person. The retrieval range in this case is the image feature of the video image stored in the first feature storing unit 207, that is, the image feature of the video image input to the information processing apparatus 100 before the acceptance time point of the retrieval instruction and stored in the video image storing unit 202. Further, the retrieval query is the image feature of the face image detected from the query image related to the retrieval instruction. The first retrieving unit 211 transfers the image obtained by the retrieval, and the information indicating the photographing place of the image, the photographing time and the like to the display processing unit 213.

Next, in S503, the first retrieving unit 211 confirms whether or not the second retrieving process by the second retrieving unit 212 is started. When the second retrieving process is started (YES in S503), the first retrieving unit 211 advances the process to S505. On the other hand, when the second retrieving process is not started (NO in S503), the first retrieving unit 211 advances the process to S504.

In S504, the first retrieving unit 211 performs the first retrieving process again. Incidentally, it should be noted that the retrieval range of the first retrieving process in S504 is the retrieval range which is in the image feature stored in the first feature storing unit 207 and is not set in the retrieval range of the already performed first retrieving process. The first retrieving unit 211 then advances the process to S503.

In this manner, the first retrieving unit 211 repeatedly performs the first retrieving process using the feature of the newly input video image as the retrieval range, until the second retrieving process is started. The first retrieving unit 211 further transfers the image obtained by the retrieval, and the information indicating the photographing place of the image, the photographing time and the like to the display processing unit 213. Then, in S505, the first retrieving unit 211 stops the first retrieving process. Thus, the process of the first thread ends. In this way, for the video image input in the period until the second retrieving process is started, the first retrieving process is performed in the retrieval range of the first retrieving process. Therefore, it is possible to shorten the un-retrievable period of time 403.

In S511 of the second thread, the second retrieving unit 212 performs a preparing process for starting the second retrieving process. The preparing process is a process of registering (recording) the image feature of the query image of the target person as a reference feature in the second feature storing unit 209. In S511, the display processing unit 213 may display the query image on the monitor 110. Next, in S512, based on the reference feature, the second retrieving unit 212 starts the second retrieving process of retrieving the target person from the video input to the information processing apparatus 100 after the acceptance time point. Then, the second retrieving unit 212 transfers the image obtained by the retrieval, and the information indicating the photographing place of the image, the photographing time and the like to the display processing unit 213. When the second retrieving process is started in S512, in S503 described above, the first retrieving unit 211 decides that the second retrieving process is started, so that the first retrieving process is stopped.

Next, in S513, the second retrieving unit 212 confirms whether or not a stop instruction is accepted by the CPU 101. When the stop instruction is not accepted (NO in S513), the CPU 101 continues the second retrieving process. On the other hand, when the stop instruction is accepted (YES in S513), the CPU 101 ends the process. For example, when the retrieval of the person designated as the query becomes unnecessary because the stray child or the missing passenger has been secured, the user inputs the stop instruction.

In S521 of the third thread, the display processing unit 213 integrates the detection results respectively obtained in S502, S504 and S512 with others, and displays the integrated detection result on the monitor 110. Next, in S522, the CPU 101 confirms whether or not the stop instruction is accepted. When the stop instruction is not accepted (NO in S522), the CPU 101 returns the process to S521 to continue the displaying process. On the other hand, when the stop instruction is accepted (YES in S522), the CPU 101 ends the process.

As just described, the information processing apparatus 100 retrieves the target person by the first retrieving process for the un-retrievable period of time 403, and then stops the first retrieving process. Then, the information processing apparatus 100 retrieves the target person by the second retrieving process until the stop instruction is accepted. Besides, by performing the first retrieving process recursively, it is possible to shorten the un-retrievable period of time which corresponds to the sum of the period of time in which the feature amount is not yet indexed by the face image feature retrieval at the time of the retrieval by designating the query person and the period of time until the face image feature discrimination. In this manner, it is possible for the information processing apparatus 100 of the present embodiment to continuously retrieve the person from the past without decreasing the processing speed.

Second Embodiment

Subsequently, the monitoring system according to the second embodiment will be described. The information processing apparatus 100 in the monitoring system according to the second embodiment performs the first retrieving process before the second retrieving process, and uses, in the second retrieving process, the image detected in the first retrieving process. Thus, it is possible to improve retrieval accuracy.

Figure 6:
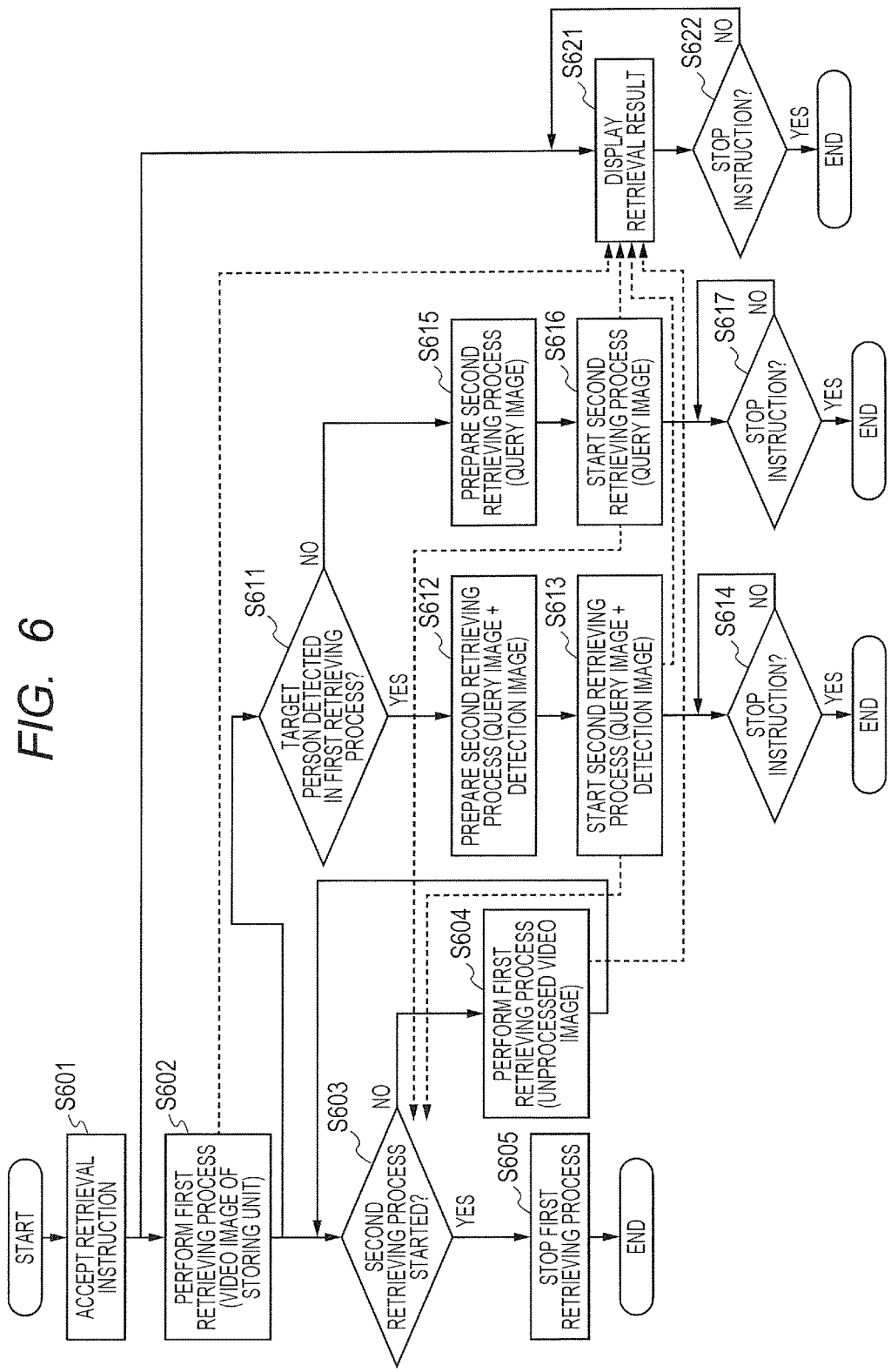
FIG. 6 is a flow chart for describing a retrieving process according to a second embodiment.

Hereinafter, a difference between the monitoring system according to the second embodiment and the monitoring system according to the first embodiment will be described. FIG. 6 is a flow chart for describing the retrieving process to be performed by the information processing apparatus 100 according to the second embodiment. In S601, the query accepting unit 208 accepts a retrieval instruction designating a query image of the person being a retrieval query. After the process of S601, the CPU 101 performs the process in two threads. The first thread is a thread which performs the retrieval, and includes the processes of S602 to S617. The second thread is a thread which performs a process of integrating and displaying retrieval results, and includes the processes of S621 and S622.

In S602 of the first thread, the first retrieving unit 211 performs the first retrieving process to retrieve the target person. The retrieval range in this case is the image feature of the video image stored in the first feature storing unit 207, that is, the image feature of the video image input to the information processing apparatus 100 before the acceptance time point of the retrieval instruction and stored in the video image storing unit 202. Further, the retrieval query is the image feature of the face image detected from the query image related to the retrieval instruction. The first retrieving unit 211 transfers the image obtained by the retrieval, and the information indicating the photographing place of the image, the photographing time and the like to the display processing unit 213.

The CPU 101 further performs the processes in the two threads, after the process of S602. The 11th thread is a thread which continues the first retrieving process, and includes the processes of S603 to S605. The 12th thread is a thread which performs the second retrieving process, and includes the processes of S611 to S617. Here, the processes of S603 to S605 of the $11^{th}$ thread are the same as the processes of S503 to S505 in the retrieving process of the first embodiment described with reference to FIG. 5.

In S611 of the 12th thread, the second retrieving unit 212 confirms whether or not the target person was detected in the first retrieving process in S602. When the target person was detected (YES in S611), the second retrieving unit 212 advances the process to S612. On the other hand, when the target person was not detected (NO in S611), the second retrieving unit 212 advances the process to S615. In S612, the second retrieving unit 212 performs preparation of the second retrieving process by using not only the query image but also the detection image in which the target person has been detected in the first retrieving process in S602.

Next, in S613, the second retrieving unit 212 starts the second retrieving process using the query image and the detection image. Next, in S614, the second retrieving unit 212 confirms whether or not a stop instruction is accepted. When the stop instruction is accepted (YES in S614), the second retrieving unit 212 ends the 21st thread process. On the other hand, when the stop instruction is not accepted (NO in S614), the second retrieving unit 212 continues the second retrieving process. In S615, the second retrieving unit 212 performs a preparing process to perform the second retrieving process using only the query image. Here, the processes of S615 to S617 are the same as the processes of S511 to S513 in the retrieving process of the first embodiment described with reference to FIG. 5.

In S621 of the second thread, the display processing unit 213 integrates the detection results respectively obtained in S602, S604, S613 and S616 with others, and displays the integrated detection result on the monitor 110. Next, in S622, the CPU 101 confirms whether or not the stop instruction is accepted. When the stop instruction is not accepted (NO in S622), the CPU 101 returns the process to S621 to continue the displaying process. On the other hand, when the stop instruction is accepted (YES in S622), the CPU 101 ends the process. Incidentally, it should be noted that the other constitution and process of the monitoring system according to the second embodiment are the same as those of the monitoring system according to the first embodiment.

As described above, the information processing apparatus 100 according to the second embodiment performs, before the second retrieving process, the first retrieving process which has, as the retrieval range, the video image input to the information processing apparatus 100 before the acceptance time point of the retrieval instruction and stored in the video image storing unit 202. Then, after the first retrieving process, the information processing apparatus 100 performs the second retrieving process by using the detection image of the target person obtained in the first retrieving process. Thus, it is possible to improve retrieval accuracy. Further, as well as the first embodiment, the information processing apparatus 100 continues the first retrieving process in a different retrieval range until the second retrieving process is started. Therefore, it is possible for the information processing apparatus 100 to continuously retrieve the person from the past without decreasing the processing speed.

Hereinafter, modified examples of the first embodiment and the second embodiment will be described. As a first modified example, the image feature is not limited to the image feature of the face image. As another example, the image feature may be a human body image feature obtained from the entire human body. That is, the human body image feature includes a numerical value such as a ratio of a body height to a body width, a ratio of a leg length to a head and body, a ratio of a leg length to a body height, or the like. As further another example, the information processing apparatus 100 may use attribute information of a person obtained from the entire human body including the face instead of the image feature. Here, an example of the attribute information includes a race, a sex, an age, presence/absence of glasses, a beard, a color of clothes, or the like.

As further another example, the information processing apparatus 100 may use both the image feature and the attribute information as the image features. For example, the information processing apparatus 100 separately calculates the scores of the first retrieving process and the second retrieving process for the image features, and the scores of the first retrieving process and the second retrieving process for the attribute information. Then, the information processing apparatus 100 may calculate the weighted sum of both the scores as a total score.

As a second modified example, the information processing apparatus 100 may distinguishably display the query person and the image being the retrieval result. Thus, it is possible to for the user to confirm whether or not erroneous retrieval is performed.

As a third modified example, when at least one of the first retrieving unit 211 and the second retrieving unit 212 detects a plurality of images of the target person, it may be possible to preferentially detect the images of different face directions.

As a fourth modified example, at least one of the first retrieving unit 211 and the second retrieving unit 212 may preferentially detect the image photographed at a time point closer to the process time point. This example is useful for the purpose of securing a person such as a stray child.

As a fifth modified example, the first retrieving unit 211 of the information processing apparatus 100 may perform the second retrieving process to the video image input to the information processing apparatus 100 before the start of the second retrieving process, and a concrete process of doing so is not limited to the that described in the embodiment. As another example, at the time point of the start of the second retrieving process, the first retrieving unit 211 may perform once the first retrieving process using as the retrieval range the feature of the video image input to the information processing apparatus 100 and stored in the video image storing unit 202 before the start of the second retrieving process.

As described above, according to the above embodiments, it is possible to continuously retrieve the person from the past without decreasing the processing speed.

Third Embodiment

Figure 7:
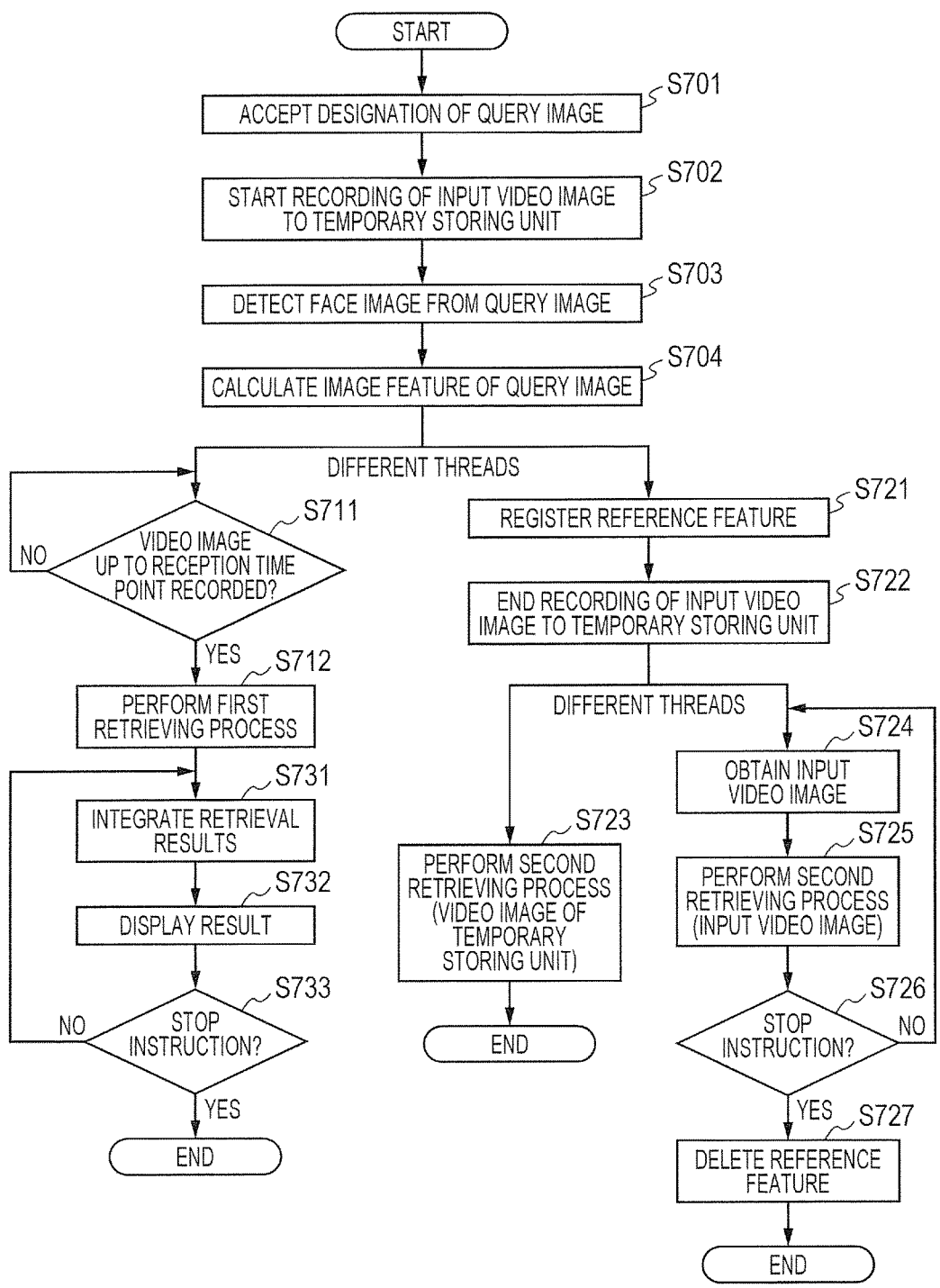
FIG. 7 is a flow chart for describing a retrieving process according to a third embodiment.

Subsequently, the third embodiment will be described. In the present embodiment, the same reference numerals are used to the constitutions already described in the above embodiments, and the description thereof will be omitted. FIG. 7 is a flow chart for describing a retrieving process to be performed by the information processing apparatus 100 according to the present embodiment. In S701, the query accepting unit 208 accepts designation of a query image of the person being a retrieval query. Next, in S702, the CPU 101 starts recording the video image accepted by the video image accepting unit 201 after the acceptance time point of the designation of the query image to the temporary storing unit 210. Next, in S703, the face detecting unit 204 detects the face image from the query image accepted by the query accepting unit 208. Next, in S704, the feature calculating unit 206 calculates the image feature from the face image of the query image detected in S703. After the process of S704, the CPU 101 performs processes in two threads.

The first thread in these two threads is a thread which performs the first retrieving process, and the second thread is a thread which performs the second retrieving process. The first thread is a process which proceeds to S711 after S704, and includes the processes of S711 and S712. The second thread is a process which proceeds to S721 after the process of S704, and includes the processes of S721 to S727. Incidentally, the processes of S731 to S733 are processes of integrating the retrieval result of the first retrieving process and the retrieval result of the second retrieving process with each other.

In S711, the first retrieving unit 211 confirms whether or not the video image up to the acceptance time point of the designation of the query image is recorded in the first feature storing unit 207. The first retrieving unit 211 stands by until the recording is completed (NO in S711). When the recording is completed (YES in S711), the process is advanced to S712. In S712, the first retrieving unit 211 retrieves the target person by using the image feature stored in the first feature storing unit 207 as the retrieval range and using the image feature of the query image calculated in S704 as the retrieval query. Then, the first retrieving unit 211 detects the image feature having similarity between the above image features higher than a predetermined threshold, from the image features stored in the first feature storing unit 207.

In S721 of the second thread, the CPU 101 registers (records) the image feature of the query image calculated in S704 as the reference feature in the second feature storing unit 209. It should be noted that the process of S721 is an example of the preparing process of the second retrieving process. Since the preparing process is completed in S721, in subsequent S722, the CPU 101 ends the recording of the video image to the temporary storing unit 210 started in S702. Thus, the video images input from the camera 112 in the preparation period from the instruction acceptance time point to the completion time point of the preparation of the second retrieving process are recorded in the temporary storing unit 210.

After the process of S722, the process is further divided into the two threads. The 21st thread of the two threads of the second thread is a process which proceeds to S723 after the process of S722. On the other hand, the 22nd thread is a process which proceeds to S724 after the process of S722, and includes the processes of S724 to S727. In S723, the second retrieving unit 212 retrieves the target person by comparing the image feature extracted from the video image stored in the temporary storing unit 210 and the image feature (reference feature) stored in the second feature storing unit 209 with each other. The second retrieving unit 212 deletes the video image for which the comparing process was ended, from the temporary storing unit 210.

On the other hand, in S724, the first retrieving unit 211 obtains the video image (input video image) input from the camera 112 after the acceptance time point of the designation of the query image as the retrieval target. Next, in S725, the second retrieving unit 212 retrieves the target person by comparing the image feature extracted from the video image accepted in S724 and the reference feature with each other. Thus, it is possible to perform the real-time retrieval for the input video image.

Next, in S726, the CPU 101 confirms whether or not a stop instruction is accepted. When the stop instruction is not accepted (NO in S726), the CPU 101 advances the process to S724. On the other hand, when the stop instruction is accepted (YES in S724), the CPU 101 advances the process to S726. In S726, the CPU 101 deletes the reference feature recorded in the second feature storing unit 209 in S721, and ends the process. For example, when the retrieval of the person designated as the query becomes unnecessary because the stray child or the missing passenger has been secured, the user inputs the stop instruction.

Incidentally, it should be noted that the CPU 101 simultaneously performs the processes of S711 to S712 and the processes of S721 and the subsequent steps as the parallel processes. Also, the CPU 101 simultaneously performs the process of S723 and the processes of S724 to S727 as the parallel processes.

After the process of S712, the CPU 101 advances the process to S731. In S731, the display processing unit 213 integrates the retrieval result of the first retrieving process obtained in S712 and the retrieval result of the second retrieving process obtained in S723 and S725 with each other. Next, in S732, the display processing unit 213 displays the retrieval result after the integration on the monitor 110. Next, in S733, the CPU 101 confirms whether or not a stop instruction is accepted. When the stop instruction is not accepted (NO in S733), the CPU 101 returns the process to S731. On the other hand, when the stop instruction is accepted (YES in S733), the CPU 101 ends the process.

As described above, the information processing apparatus 100 according to the present embodiment records the video image in the preparation period of the second retrieving process to the temporary storing unit 210. Thus, it is possible to perform the person retrieval also in regard to the video image in the preparation period. The information processing apparatus 100 can further perform the first retrieving process and the real-time retrieval. That is, it is possible for the information processing apparatus 100 to perform the person retrieval continuously from the past video images at an appropriate processing speed. In addition, since the real-time retrieval can be performed, it is also possible to secure the target person. Further, since the past video image can be retrieved, it is possible to estimate the place to which the target person will move. Incidentally, since there are a large processing load in the second retrieving process, it is desirable to promptly end the second retrieving process when the retrieval becomes unnecessary because, for example, the query person could be secured. In this context, the information processing apparatus 100 can promptly end the second retrieving process in response to the stop instruction.

Fourth Embodiment

Figure 8:
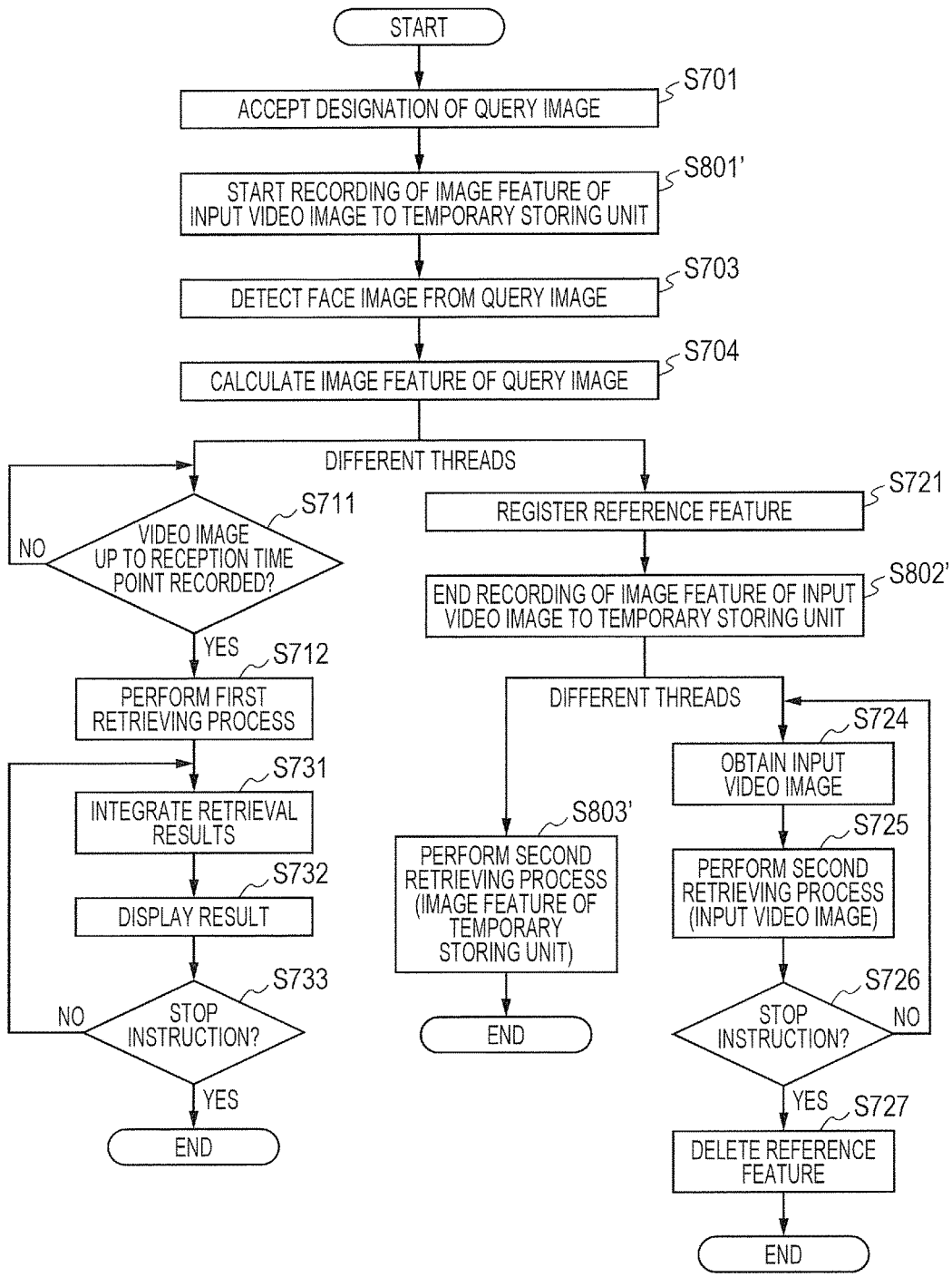
FIG. 8 is a flow chart for describing a retrieving process according to a fourth embodiment.

In the monitoring system according to the fourth embodiment, the temporary storing unit 210 of the information processing apparatus 100 stores the image feature calculated from the video image of the preparation period, instead of the video image of the preparation period. Hereinafter, the difference between the monitoring system according to the fourth embodiment and the monitoring system according to the third embodiment will be described. FIG. 8 is a flow chart for describing a retrieving process to be performed by the information processing apparatus 100 according to the fourth embodiment. Incidentally, in the processes included in the retrieving process described in FIG. 8, the same processes as those of the retrieving process according to the third embodiment described with reference to FIG. 7 are denoted by the same reference numerals respectively.

In the fourth embodiment, after the process of S701, the CPU 101 advances the process to S801'. In S801', the CPU 101 starts recording the image feature of the video image accepted by the video image accepting unit 201 to the temporary storing unit 210 after the acceptance time period of the acceptance of the designation of the query image. It should be noted that the feature calculating unit 206 performs the process of calculating the image feature from the video image accepted by the video image accepting unit 201. The CPU 101 then advances the process to S703.

Besides, after the process of S721, the CPU 101 advances the process to S802'. In S802', the CPU 101 ends the recording of the image feature to the temporary storing unit 210 started in S801'. The subsequent process is divided into the two threads. In the two threads, the 21st thread is a process which proceeds to S803' after the process of S802'. Besides, the process of the 22nd thread is the same as the process of the 22nd thread described in the third embodiment.

In S803', the second retrieving unit 212 retrieves the target person by comparing the image feature stored in the temporary storing unit 210 and the reference feature with each other. The second retrieving unit 212 deletes the image feature for which the comparing process was ended, from the temporary storing unit 210. Incidentally, the remaining constitutions and processes of the monitoring system according to the fourth embodiment are the same as the corresponding constitution and processes of the monitoring system according to the third embodiment.

As described above, the information processing apparatus 100 according to the fourth embodiment records, instead of the video image, the image feature calculated from the video image to the temporary storing unit 210. Thus, it is possible to reduce the processing load to the information processing apparatus 100 after the start of the retrieving process.

Fifth Embodiment

Figure 9:
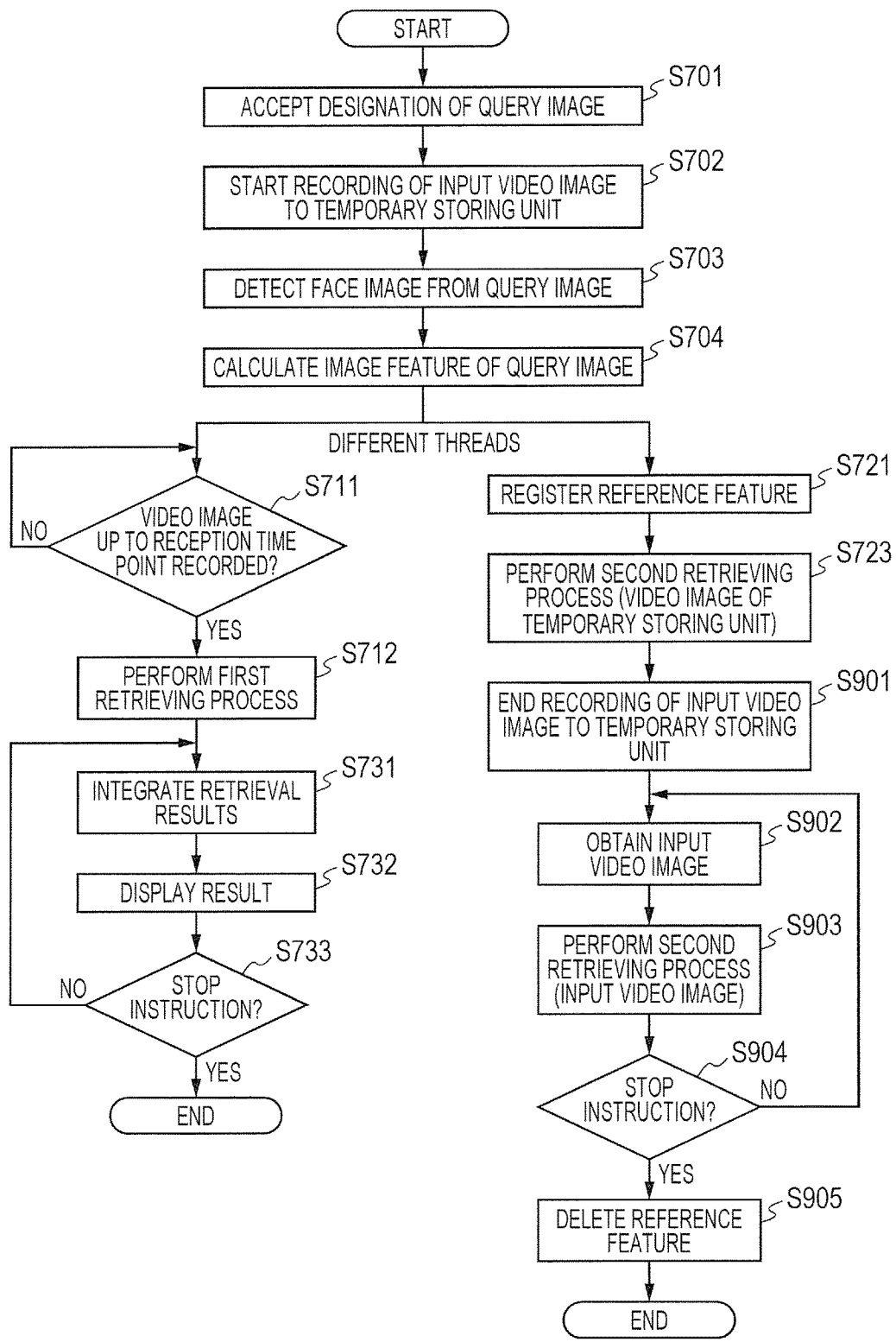
FIG. 9 is a flow chart for describing a retrieving process according to a fifth embodiment.

In the monitoring system according to the fifth embodiment, the second retrieving unit 212 of the information processing apparatus 100 first performs the second retrieving process using the video image stored in the temporary storing unit 210 as the retrieval range. Then, after the relevant process is ended, the second retrieving unit 212 performs the second retrieving process to the video imager input from the camera 112. Hereinafter, the difference between the monitoring system according to the fifth embodiment and the monitoring system according to the third embodiment will be described. FIG. 9 is a flow chart for describing a retrieving process to be performed by the information processing apparatus 100 according to the fifth embodiment. Incidentally, in the processes included in the retrieving process described in FIG. 9, the same processes as those of the retrieving process according to the third embodiment described with reference to FIG. 7 are denoted by the same reference numerals respectively.

In the fifth embodiment, after the process of S721, the CPU 101 advances the process to S723. That is, while the CPU 101 continues to record the video image to the temporary storing unit 210 started in S702, in S723, the second retrieving unit 212 performs the second retrieving process using the video image stored in the temporary storing unit 210 as the retrieval range. The CPU 101 then advances the process to S901. In S901, the CPU 101 ends the recording of the video image to the temporary storing unit 210.

As described above, in the fifth embodiment, after the end of the second retrieving process using the video image stored in the temporary storing unit 210 as the retrieval range, the CPU 101 ends the recording of the video image to the temporary storing unit 210. After then, the CPU 101 advances the process to S902. Here, it should be noted that the processes of S902 to S905 are respectively the same as the processes of S724 to S727 described with reference to FIG. 7. Incidentally, it should be noted that the other constitution and process of the monitoring system according to the fifth embodiment are the same as those of the monitoring systems according to other embodiments.

As described above, the information processing apparatus 100 according to the fifth embodiment performs the real-time retrieval after the end of the retrieving process to the video image stored in the temporary storing unit 210. Thus, the start timing of the real-time retrieval is delayed as compared with that of the information processing apparatus 100 according to other embodiments. However, it is possible to reduce the processing load to the information processing apparatus 100 at the time of the real-time retrieval.

As a modified example of the fifth embodiment, as well as the description of the fourth embodiment, the information processing apparatus 100 may record, instead of the video image, the image feature calculated from the video image to the temporary storing unit 210.

Sixth Embodiment

The information processing apparatus 100 according to the sixth embodiment performs control, in a case where the number of persons to be retrieved is plural, such that the processes to the video images input from the cameras 112 do not overlap. Thus, it is possible to perform the efficient process. It is assumed that the information processing apparatus 100 according to the present embodiment is performing the second retrieving process to another person (assumed as a person B) at the time point when a query image (assumed as a person A) is designated. In such a case, the information processing apparatus 100 records the image feature calculated to be used for the second retrieving process of the person B, to the temporary storing unit 210.

Hereinafter, the difference between the retrieving process by the information processing apparatus 100 according to the sixth embodiment and the retrieving process according to the fourth embodiment will be described with reference to FIG. 8. In the sixth embodiment, the information processing apparatus 100 uses a temporary storage request flag as a flag as to whether or not to store the image feature related to the second retrieving process of another person in the temporary storing unit 210. It is assumed that the temporary storage request flag is normally in an OFF state.

In S801', the CPU 101 confirms whether or not the second retrieving process to the person (another person) other than the target person is being performed. When the relevant process is not being performed, the CPU 101 starts recording the image feature of the video image accepted by the video image accepting unit 201 to the temporary storing unit 210, as well as the description of the fourth embodiment. On the other hand, when the second retrieving process to another person is being performed, the CPU 101 turns the temporary storage request flag ON. Moreover, in S802', the CPU 101 ends the temporary storing process when the temporary storage request flag is OFF, that is, when the temporary storing process is being performed. The CPU 101 turns OFF when the temporary storage request flag is ON.

In S724, when the temporary storage request flag is OFF, the CPU 101 deletes, from the temporary storing unit 210, the image feature calculated from the video image accepted by the video image accepting unit 201, after the second retrieving process is ended. On the other hand, when the temporary storage request flag is ON, the CPU 101 records the image feature calculated from the video image accepted by the video image accepting unit 201, to the temporary storing unit 210. As another example, the CPU 101 may store not only image feature but also the corresponding video image in the temporary storing unit 210.

In S726, in case of accepting the stop instruction, when the temporary storage request flag is ON, the CPU 101 starts the process of recording the image feature calculated from the video image accepted by the video image accepting unit 201 to the temporary storing unit 210. At this time, the CPU 101 further turns the temporary storage request flag OFF. In case of accepting the stop instruction, when the temporary storage request flag is OFF, the CPU 101 does nothing. Incidentally, in the monitoring system according to the sixth embodiment, the constitutions and processes other than those described above are respectively the same as the constitutions and processes of the monitoring systems in other embodiments.

As described above, in the information processing apparatus 100 according to the sixth embodiment, when the second retrieving process for another person is being performed at the time point of the acceptance of the designation of the query image of the target person, the image feature of the relevant another person is stored in the temporary storing unit 210. Thus, it is possible to reduce the processing load to the information processing apparatus 100 at the time of retrieving the plurality of persons.

Seventh Embodiment

In the information processing apparatus 100 according to the seventh embodiment, the temporary storing unit 210 stores the video images input during a predetermined period from the process time point. Then, after the preparing process of the second retrieving process by the query image is completed, the first retrieving unit 211 performs the second retrieving process, and simultaneously performs the first retrieving process to the video images input before (past) the acceptance time point of the designation of the query image. Thus, it is possible to retrieve the target person also for the video image in the un-retrievable period of time. That is, the information processing apparatus 100 according to the seventh embodiment retrieves the target person in the second retrieving process also for the un-retrievable period of time of the first retrieving process. In this respect, the information processing apparatus 100 in the present embodiment is different from those in other embodiments.

Figure 10:
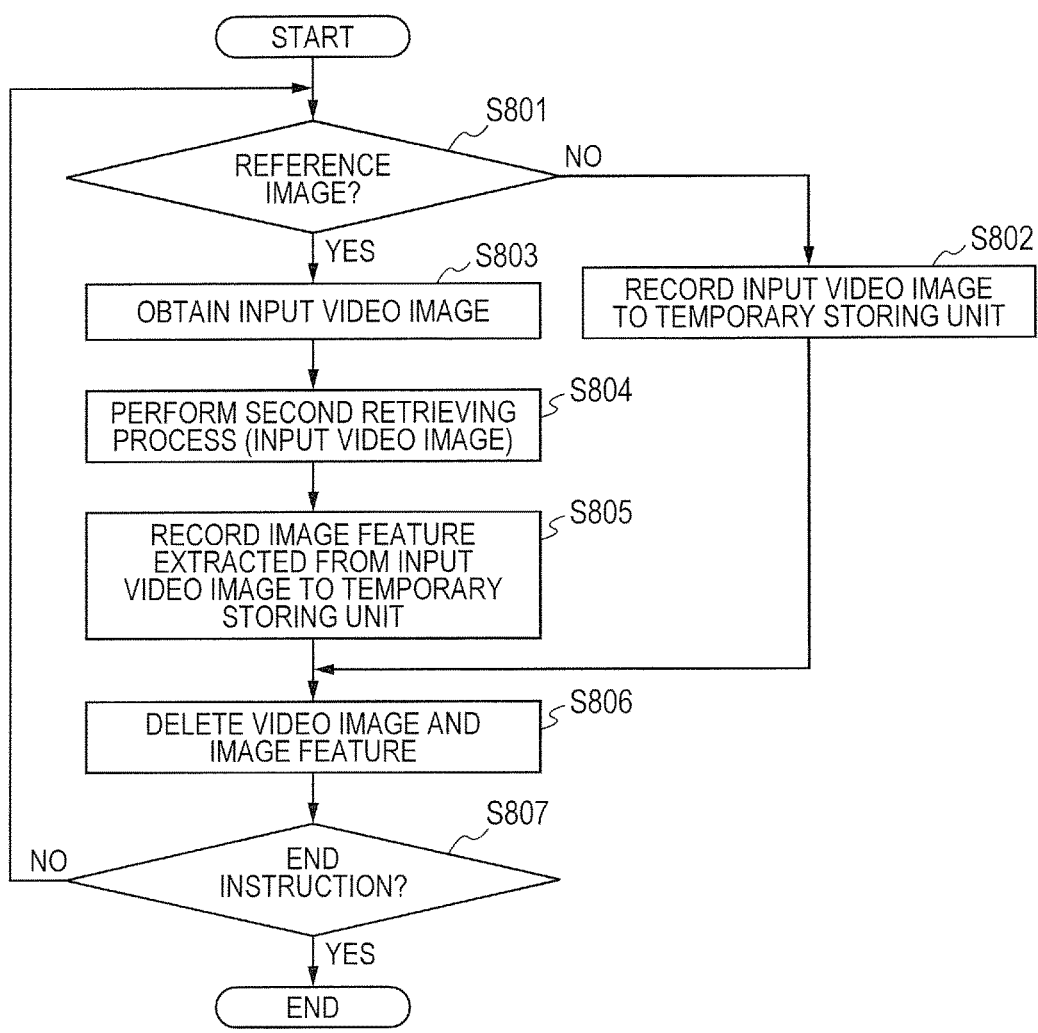
FIG. 10 is a flow chart for describing a resident retrieving process according to a seventh embodiment.

FIG. 10 is a flow chart for describing a resident retrieving process to be performed by the information processing apparatus 100 according to the seventh embodiment. The information processing apparatus 100 always performs the resident retrieving process as illustrated in FIG. 10. In S801, the CPU 101 confirms whether or not a reference feature is stored in the second feature storing unit 209. When the reference feature is stored (YES in S801), the CPU 101 advances the process to S803. On the other hand, when the reference feature is not stored (NO in S801), the CPU 101 advances the process to S802. In S802, the CPU 101 records the video image accepted by the video image accepting unit 201 to the temporary storing unit 210, and then advances the process to S806.

Incidentally, the processes of S803 and S804 are the same as the processes of S724 and S725 described with reference to FIG. 7. After the process of S804, the CPU 101 advances the process to S805. In S805, the CPU 101 records the image feature extracted from the input video image used in S803, to the temporary storing unit 210. Next, in S806, the CPU 101 deletes, from the temporary storing unit 210, the video image recorded to the temporary storing unit 210 before the time of day before a predetermined time from the time of day when the process was performed, and the image feature extracted from the input video image. Here, it is preferable that the predetermined time is determined in consideration of the time until the first retrieving process becomes performable and the preparation period of the second retrieving process. For example, the information processing apparatus 100 sets the total value of these times as the predetermined time. Incidentally, by the processes of S802 and S806, the temporary storing unit 210 always stores the video images for the predetermined time or the image features extracted from the video images. Here, the processes of S802 and S806 are an example of a managing process of performing management such that the temporary storing unit 210 stores the video image input before the predetermined time from the time point of the process or the image feature extracted from the video image.

Next, in S807, the CPU 101 confirms whether or not an end instruction is accepted. When the end instruction is accepted (YES in S807), the CPU 101 ends the process. On the other hand, when the end instruction is not accepted (NO in S807), the CPU 101 advances the process to S801.

Figure 11:
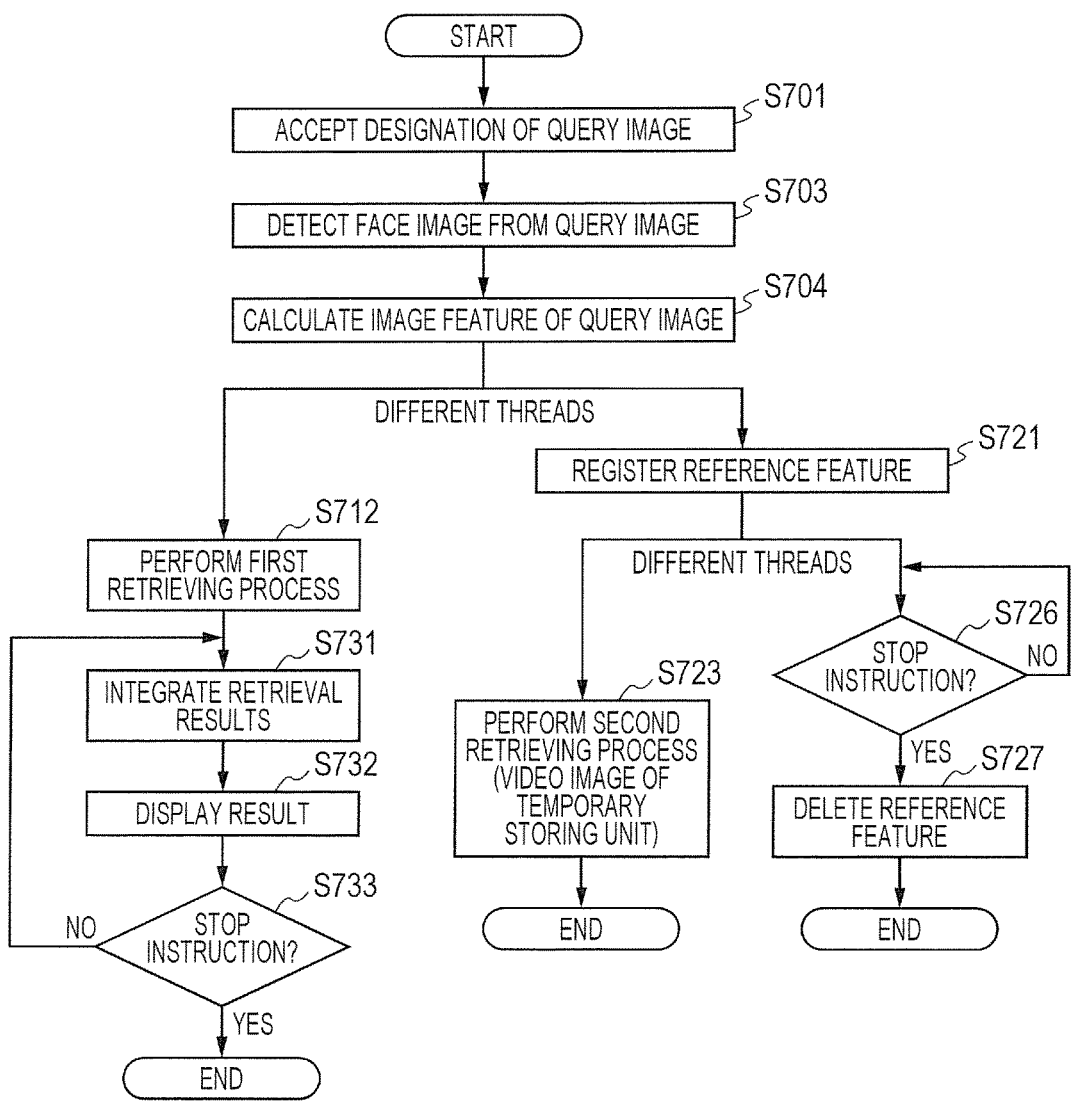
FIG. 11 is a flow chart for describing a retrieving process according to the seventh embodiment.

FIG. 11 is a flow chart for describing a retrieving process to be performed by the information processing apparatus 100 according to the seventh embodiment. Incidentally, in the processes included in the retrieving process described in FIG. 11, the same processes as those of the retrieving process according to the third embodiment described with reference to FIG. 7 are denoted by the same reference numerals respectively. In the retrieving process according to the seventh embodiment, the CPU 101 advances the process to S703 after the process of S701. Further, after the process of S704, the CPU 101 performs the process of the first thread by advancing the process to S712 instead of S711. On the other hand, in the second thread, after the process of S721, the CPU 101 skips the process of S722 and performs the two threads. In these threads, the 21st includes the process of S723, and the 22nd thread includes the processes of S726 and S727.

In the present embodiment, the video image and the face image feature are mixedly stored in the temporary storing unit 210. In S723, the second retrieving unit 212 calculates the image feature of the video image stored in the temporary storing unit 210, and compares the image feature of the video image and the reference feature stored in the second feature storing unit 209 with each other. Then, the second retrieving unit 212 detects the image feature having similarity higher than a predetermined threshold. Further, the second retrieving unit 212 compares the image feature stored in the temporary storing unit 210 and the reference feature stored in the second feature storing unit 209 with each other, and detects the face image feature having the similarity higher than the predetermined threshold. Incidentally, it should be noted that the other constitution and process of the monitoring system according to the seventh embodiment are the same as those of the monitoring systems according to other embodiments.

As described above, the information processing apparatus 100 according to the seventh embodiment always performs the second retrieving process, and the temporary storing unit 210 always stores therein the video image input during the past predetermined period. Then, after elapse of the preparation period of the second retrieving process by the query image, the information processing apparatus 100 performs the second retrieving process and also performs the first retrieving process to the past video image. Thus, the information processing apparatus 100 according to the seventh embodiment can immediately perform the retrieval to the past image before the acceptance time point of the designation of the query image, and can perform the high-precision retrieval by the second retrieving process also for the delay section until the retrieval becomes possible.

As a first modified example of the seventh embodiment, as well as the description of the fourth embodiment, the information processing apparatus 100 may store, instead of the video image, the image feature calculated from the video image to the temporary storing unit 210.

Besides, a second modified example of the seventh embodiment will be described. The information processing apparatus 100 may perform the resident retrieving process and the retrieving process described in the fifth embodiment, for only the image input from the part of the plurality of cameras 112 connected to the information processing apparatus 100 as the target. Incidentally, it should be noted that the information processing apparatus 100 performs the retrieving process described in the other embodiment (for example, the third embodiment) with respect to the video image input from another camera 112. For example, it is assumed that a security gate system which permits passage of a person who has been registered by face authentication has been introduced. In this case, the information processing apparatus 100 performs the process according to the fifth embodiment for an authentication camera to be used in such a security gate, and performs, for the other camera, the process according to the other embodiment.

Hereinafter, modified examples of the above-described embodiments will be described. As a first modified example, the image feature is not limited to the image feature of the face image. As another modified example, the image feature may be a human body image feature obtained from an entire human body. For example, the human body image feature includes a numerical value such as a ratio of a body height to a body width, a ratio of a leg length to a head and body, a ratio of a leg length to a body height, or the like. As further another example, the information processing apparatus 100 may use attribute information of a person obtained from the entire human body including the face instead of the image feature. For example, the attribute information includes a race, a sex, an age, presence/absence of glasses, a beard, a color of clothes, or the like.

As further another example, the information processing apparatus 100 may use both image feature and the attribute information as the image feature. For example, the information processing apparatus 100 separately calculates the scores of the first retrieving process and the second retrieving process for the image feature, and the scores of the first retrieving process and the second retrieving process of the attribute information. Then, the information processing apparatus 100 may calculate the weighted sum of both the scores as the total score.

As described above, according to each of the above-described embodiments, it is possible to continuously retrieve the person from the past at an appropriate processing speed.

Although the present invention has been described in detail based on the preferred embodiments thereof, the present invention is not limited to these specific embodiments. Namely, various embodiments within the scope not departing from the scope of the invention are also included in the present invention. Besides, the parts of the above embodiments may be appropriately combined.

In the above description, it is possible in the first retrieving process to obtain the detection image of the target person, by identifying the image feature having the similarity higher than the predetermined threshold, However, for example, it may be possible to be able to obtain the detection image of the target person by identifying the target person by the user (surveillant) who uses the information processing apparatus 100, and inputting such information via the inputting unit of the information processing apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to continuously retrieve the person from the past without decreasing the processing speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-083882, filed Apr. 19, 2016, and Japanese Patent Application No. 2016-083874, filed Apr. 19, 2016, which are hereby incorporated by reference herein in their entirety.

What is claimed is:

1. An information processing apparatus comprising:
    at least one processor programmed to cause the information processing apparatus to function as:
        a first storage that stores a feature of a person extracted from a video image input from an imaging unit;
        an acceptance that accepts designation of a query image of a target person being a retrieval query;
        a first retriever that, based on the feature of the target person extracted from the query image, performs a first retrieving process of retrieving the target person from the feature stored in the first storage, using, as a retrieval target range, in a period before a first time point at which the designation is accepted and before a preparation period including from the first time point to a second time point at which the feature of the target person is extracted from the query image; and
        a second retriever that, based on the feature of the target person extracted from the query image, performs a second retrieving process of retrieving the target person from the feature of the person extracted from the video image input from the imaging unit, using, as a retrieval target range, in a period after the first time point and excluding the preparation period.

2. The information processing apparatus according to claim 1, wherein the at least one processor is programmed to further cause the information processing apparatus to function as:

an integrator that integrates a retrieval result of the first retriever and a retrieval result of the second retriever with each other; and a display that displays a retrieval result after the integration by the integrator.

3. The information processing apparatus according to claim 1, wherein the first retriever is configured to end the first retrieving process in a case where the second retrieving process is started.

4. The information processing apparatus according to claim 1, wherein, in a case where the target person is detected by the first retriever, the second retriever retrieves the target person based on an image in which the target person has been detected and the query image.

5. The information processing apparatus according to claim 1, wherein the first retriever starts the first retrieving process of retrieving the target person, by storing, as a retrieval target range, the feature extracted from the video image input during a predetermined period before the first time point.

6. The information processing apparatus according to claim 1, wherein the second retriever ends the second retrieving process in a case where a stop instruction is accepted.

7. The information processing apparatus according to claim 1, wherein the second retriever ends the second retrieving process in a case where the person extracted from the video image input from the imaging unit is out of a retrieval range or in a case where a time after the person was extracted from the video image input from the imaging unit exceeds a predetermined time.

8. The information processing apparatus according to claim 2, wherein the display distinguishably displays the query image and the retrieval result.

9. An information processing apparatus comprising:
at least one processor programmed to cause the information processing apparatus to function as:
a first storage that stores a feature of a person extracted from a video image input from an imaging unit an acceptance that accepts designation of a query image of a target person being a retrieval query;
a second storage that stores a feature of the target person extracted from the query image;
a first retriever that, based on the feature of the target person extracted from the query image, performs a first retrieving process of retrieving the target person from a feature of a person stored in the first storage before a first time point of the acceptance of the designation of the query image;
a second retriever that, based on the feature of the target person stored in the second storage, performs a second retrieving process of retrieving the target person from the feature of the person extracted from the video image input by the imaging unit after a second time point at which the feature of the target person is extracted from the query image; and
a third storage that stores the feature extracted from the video image input by the imaging unit, in a predetermined time which is longer than a sum of a first predetermined period indicating a period until the first retrieving process becomes performable and a second predetermined period, wherein
the second retriever retrieves the target person from the feature of the person stored in the third storage, based on the feature of the target person stored in the second storage.

10. The information processing apparatus according to claim 9, wherein the at least one processor is programmed to further cause the information processing apparatus to function as:
an integrator that integrates a retrieval result of the first retriever and a retrieval result of the second retriever with each other; and
a display that displays a retrieval result after the integration by the integrator.

11. The information processing apparatus according to claim 9, wherein the third storage stores the video image input from the imaging unit, during a preparation period at least including from the first time point to the second time point at which the preparation of the second retrieving process is ready, and
the second retriever retrieves the target person from the video image in the preparation period, based on the feature of the person extracted from the video image stored in the third storage and the feature of the target person stored in the second storage.

12. The information processing apparatus according to claim 9, wherein
the third storage stores, as a retrieval target range, the feature extracted from the video image input while from a predetermined period before the first time point to the first time point, and
the second retriever retrieves the target person from the feature of the person stored in the third storage, based on the feature of the target person stored in the second storage.

13. The information processing apparatus according to claim 11, wherein the second retriever performs a process of retrieving the target person from the video image input after the preparation period, after a process of retrieving the target person from the video image in the preparation period.

14. The information processing apparatus according to claim 11, wherein the second retriever performs a process of retrieving the target person from the video image input in the preparation period and a process of retrieving the target person from the video image input after the preparation period, as parallel processes.

15. The information processing apparatus according to claim 9, wherein the first retriever and the second retriever respectively perform the first retrieving process and the second retrieving process, as parallel processes.

16. The information processing apparatus according to claim 9, wherein
the acceptance accepts a query image of a person different from the target person, before the first time point of the acceptance of the query image of the target person,
the at least the one processor is programmed to further cause the information processing apparatus to function that a fourth storage, in a case where the query image of the target person is accepted while a process of retrieving the person different from the target person from a feature extracted from the video image input by the imaging unit is being performed, stores the feature used in the retrieval of the person different from the target person, and
the second retriever retrieves the target person from the feature stored in the fourth storage, based on the feature extracted from the query image of the target person.

17. The information processing apparatus according to claim 9, wherein the second retriever retrieves the target person in parallel from the feature stored in the third storage and the feature extracted from the video image input from the imaging unit after the second time point.

18. An information processing method to be performed by an information processing apparatus, the information processing method comprising:

storing, in a first storage, a feature of a person extracted from a video image input from an imaging unit;
accepting designation of a query image of a target person being a retrieval query;
performing, based on the feature of the target person extracted from the query image, a first retrieving process of retrieving the target person from the feature stored in the first storage, using, as a retrieval target range, in a period before a first time point at which the designation is accepted and before a preparation period including from the first time point to a second time point at which the feature of the target person is extracted from the query image; and
performing, based on the feature of the target person extracted from the query image, a second retrieving process of retrieving the target person from the feature of the person extracted from the video image input from the imaging unit, using, as a retrieval target range, in a period after the first time point and excluding the preparation period.

19. An information processing method to be performed by an information processing apparatus, the information processing method comprising:

storing, in a first storage, a feature of a person extracted from a video image input from an imaging unit;
accepting designation of a query image of a target person being a retrieval query;
storing, in a second storage, a feature of the target person extracted from the query image;
performing, based on the feature of the target person extracted from the query image, a first retrieving process of retrieving the target person from a feature of a person stored in the first storage before a first time point of the acceptance of the designation of the query image;
performing, based on the feature of the target person stored in the second storage, a second retrieving process of retrieving the target person from the feature of the person extracted from the video image input by the imaging unit after a second time point at which the feature of the target person is extracted from the query image; and
storing, in a third storage, the feature extracted from the video image input from the imaging unit, in a predetermined time which is longer than a sum of a first predetermined period indicating a period until the first retrieving process becomes performable and a second predetermined period, wherein
the target person is retrieved from the feature of the person stored in the third storage, based on the feature of the target person stored in the second storage.

20. A non-transitory computer-readable storage medium storing a program to cause a computer to function as:

a first storage that stores a feature of a person extracted from a video image input from an imaging unit;
an acceptance that accepts designation of a query image of a target person being a retrieval query;
a first retriever that, based on the feature of the target person extracted from the query image, performs a first retrieving process of retrieving the target person from the feature stored in the first storage, using, as a retrieval target range, in a period before a first time point at which the designation is accepted and before a preparation period including from the first time point to a second time point at which the feature of the target person is extracted from the query image; and
a second retriever that, based on the feature of the target person extracted from the query image, performs a second retrieving process of retrieving the target person from the feature of the person extracted from the video image input from the imaging unit, using, as a retrieval target range, in a period after the first time point and excluding the preparation period.

21. A non-transitory computer-readable storage medium storing a program to cause a computer to perform:

storing, in a first storage, a feature of a person extracted from a video image input from an imaging unit;
accepting designation of a query image of a target person being a retrieval query;
storing, in a second storage, a feature of the target person extracted from the query image;
performing, based on the feature of the target person extracted from the query image, a first retrieving process of retrieving the target person from a feature of a person stored in the first storage before a first time point of the acceptance of the designation of the query image;
performing, based on the feature of the target person stored in the second storage, a second retrieving process of retrieving the target person from the feature of the person extracted from the video image input by the imaging unit after a second time point at which the feature of the target person is extracted from the query image; and
storing, in a third storage, the feature of the person extracted from the video image input from the imaging unit, in a predetermined time which is longer than a sum of a first predetermined period indicating a period until the first retrieving process becomes performable and a second predetermined period, wherein
the target person is retrieved from the feature of the person stored in the third storage, based on the feature of the target person stored in the second storage.

* * * * *